United States Patent
Wada

(10) Patent No.: US 9,052,027 B2
(45) Date of Patent: Jun. 9, 2015

(54) VALVE DEVICE FOR FUEL TANK

(75) Inventor: Toshio Wada, Stockton on Tees (GB)

(73) Assignee: NIFCO INC., Yokohama-Shi, Kanagawa (JP)

(*) Notice: Subject to any disclaimer, the term of this patent is extended or adjusted under 35 U.S.C. 154(b) by 159 days.

(21) Appl. No.: 13/517,207

(22) PCT Filed: Dec. 22, 2010

(86) PCT No.: PCT/JP2010/073184
§ 371 (c)(1),
(2), (4) Date: Jul. 9, 2012

(87) PCT Pub. No.: WO2011/078247
PCT Pub. Date: Jun. 30, 2011

(65) Prior Publication Data
US 2012/0279581 A1 Nov. 8, 2012

(30) Foreign Application Priority Data
Dec. 25, 2009 (JP) .................. 2009-294675

(51) Int. Cl.
*F16K 24/04* (2006.01)
*B60K 15/035* (2006.01)
*F02M 37/00* (2006.01)
*B60K 15/03* (2006.01)
*F02M 25/08* (2006.01)

(52) U.S. Cl.
CPC ......... *F16K 24/044* (2013.01); *B60K 15/03519* (2013.01); *B60K 2015/03576* (2013.01); *F02M 37/0082* (2013.01); *B60K 2015/03289* (2013.01); *B60K 2015/0346* (2013.01); *F02M 2025/0845* (2013.01)

(58) Field of Classification Search
CPC ............... F16K 24/042; F16K 24/044; B60K 15/03519; B60K 2015/03576; B60K 2015/03289; B60K 2015/0346; F02M 37/0082; F02M 2025/0845
USPC ............................................. 137/202
See application file for complete search history.

(56) References Cited

U.S. PATENT DOCUMENTS 5,172,714 A * 12/1992 Kobayashi et al. ............ 137/39
5,518,018 A   5/1996 Roetker
(Continued)

FOREIGN PATENT DOCUMENTS

JP 2008-075596 A 4/2008
JP 2008-184093 A 8/2008

OTHER PUBLICATIONS

China Patent Office, "Office action for 201080058963.7," Nov. 29, 2013.

*Primary Examiner* — Elizabeth Houston
*Assistant Examiner* — Ian Paquette
(74) *Attorney, Agent, or Firm* — Manabu Kanesaka

(57) ABSTRACT

A valve device for a fuel tank includes a float element accommodated vertically movably in a case. The float element has a seal member at an upper portion thereof. The fuel flowing into the case through the inflow portion rises the float element to seat the seal member on the vent valve port. A ventilation portion connecting between inside of the tank and inside of the case is formed at an upper face portion of the case positioned above a waterline of the float element when seated. The upper face portion of the float element positioned in close proximity to the upper face portion reduces the amount of ventilation through the ventilation portion when seated. The valve device for a fuel tank further includes a regulation portion at the upper face portion of the case in which the interval is constant between the upper face portion of the case and the upper face portion of the float element when seated.

1 Claim, 6 Drawing Sheets

(56) References Cited

U.S. PATENT DOCUMENTS

| | | |
|---|---|---|
| 5,529,086 A | 6/1996 | Kasugai et al. |
| 5,566,705 A | 10/1996 | Harris |
| 2004/0055638 A1 | 3/2004 | Yamada et al. |
| 2008/0142087 A1* | 6/2008 | Muto et al. ............ 137/43 |
| 2008/0236672 A1 | 10/2008 | Horiba et al. |
| 2009/0211649 A1* | 8/2009 | Miura et al. ............ 137/202 |
| 2010/0200079 A1* | 8/2010 | Matsuzaki et al. ...... 137/202 |
| 2011/0005609 A1* | 1/2011 | Suzuki et al. ............ 137/202 |

* cited by examiner

VALVE DEVICE FOR FUEL TANK

TECHNICAL FIELD

The present invention relates to an improvement in a valve device that is mounted to a fuel tank of an automobile, a motorcycle or the like, and that functions to allow communication between the inside and outside of the tank in the valve-opened state.

TECHNICAL BACKGROUND

Patent Document 1 discloses one of valve devices that have a fuel tank-use cutoff valve and means for detecting whether a fuel tank is filled up with fuel. The device includes an evaporator opening at the upper portion of a housing accommodating a float valve, and a fuel opening at the lowermost portion. When the fuel surface reaches the fuel opening by the fuel being supplied, the float valve rises and closes the evaporator opening. This allows the fuel level inside the filler pipe to rise, and the sensor of a fuel supply gun to detect that the fuel tank is filled up with the fuel, so as to stop the fuel supply. A through hole is provided at the upper portion of the housing of the device. Once the oil supply is stopped, the balance is achieved between the pressure inside the housing and the pressure inside the tank by ventilation through this through hole. This allows the fuel level in the housing to lower, and the float valve lowers. In this state, since ventilation through the through hole and the evaporator opening is established, the pressure inside the tank lowers and the fuel level inside the filler pipe also lowers, whereby the state where additional fuel supply is possible is created. However, the device disclosed in Patent Document 1 is just simply provided with the through hole at the housing; therefore, the float valve is prone to lower immediately after it is detected that the fuel tank is filled up with the fuel. When the fuel level inside the filler pipe lowers immediately after the fuel tank being filled up is detected, the automatic stop of the fuel supply gun is released, which enables immediate additional fuel supply, and invites excessive fuel supply.

RELATED ART DOCUMENT

Patent Document

Patent Document 1: Japanese Patent No. 3909837 B2

SUMMARY OF THE INVENTION

Problem to be Solved by the Invention

The main problem to be solved by the present invention is, in connection with device for the fuel tank of this kind, to prevent an immediate reduction in the fuel level inside the filler pipe after fuel supply is stopped by the sensor of the fuel supply gun detecting that the fuel tank is filled up with fuel based on an increase in the fuel level inside the filler pipe.

Means for Solving the Problem

In order to solve the problem stated above, the present invention is directed to a valve device for a fuel tank that is mounted on a fuel tank for use, including:

a case having a vent valve port communicating with outside of a tank at an upper portion of the case and an inflow portion for fuel below the vent valve port; and a float element accommodated in the case to move vertically. The float element has a seal member at an upper portion of the float element. The fuel flows into the case through the inflow portion rising the float element to seat the seal member on the vent valve port.

A ventilation portion connecting between inside of the tank and inside of the case is formed at an upper face portion of the case positioned above a waterline of the float element when seated. The upper face portion of the float element positioned in close proximity to the upper face portion of the case reduces an amount of ventilation through the ventilation portion.

The valve device for a fuel tank further includes a regulation portion at the upper face portion of the case, which stabilizes an interval between the upper face portion of the case and the upper face portion of the float element when seated. When the fuel level inside the tank reaches the inflow portion of the case, since the pressure inside the tank rises and the pressure inside the case is lower than that, the fuel flows into the case. When the fuel flowing into the case reaches a prescribed level, the float element rises and the vent valve port is closed. The fuel level rising inside the filler pipe causes the sensor of the fuel supply gun to detect that the tank is filled up with the fuel. When the fuel supply is stopped, the pressure difference between the inside of the tank and the inside of the case is gradually eliminated through the ventilation through the ventilation portion. Then, the fuel level inside the case lowers, the float element lowers, and the vent valve port is re-opened. Thereafter, ventilation is established between the ventilation portion and the vent valve port, and the fuel level inside the filler pipe also lowers. Here, the valve device according to the present invention is structured such that the amount of ventilation through the ventilation portion is reduced by the upper face portion of the float element positioned in close proximity to the upper face portion of the case when seated. Thus, after the sensor of the fuel supply gun detects that the tank is filled up with the fuel and stops the fuel supply, the difference in the pressure between the inside of the case and the inside of the tank can gradually be reduced. Thus, an immediate reduction in the fuel level inside the filler pipe is avoided, whereby an excessive fuel supply to the fuel tank can be prevented.

Further, due to the regulation portion, the interval, between the upper face portion of the case and the upper face portion of the float element when the float element fully rises to allow the seal member to be seated on the vent valve port, will not be eliminated or become excessively narrow, and the ventilation volume through the ventilation portion per unit time when seated can accurately be managed. This makes it possible to stabilize the time from when the float element lowers because of the fuel supply being stopped after the seating takes place and until when the vent valve port is opened again. Further, maintaining such a constant interval also makes it possible to stabilize the deflection amount of the seal member when seated. One preferred embodiment is to structure the regulation portion as a projecting portion that projects downward from the upper face portion of the case.

Effect of the Invention

The present invention can provide the device that can establish ventilation between the inside and outside of the fuel tank, and that possesses the function of preventing an excessive fuel supply, without inviting complication in the structure while ensuring prevention of the excessive fuel supply.

MODE FOR CARRYING OUT THE INVENTION

Figure 1:
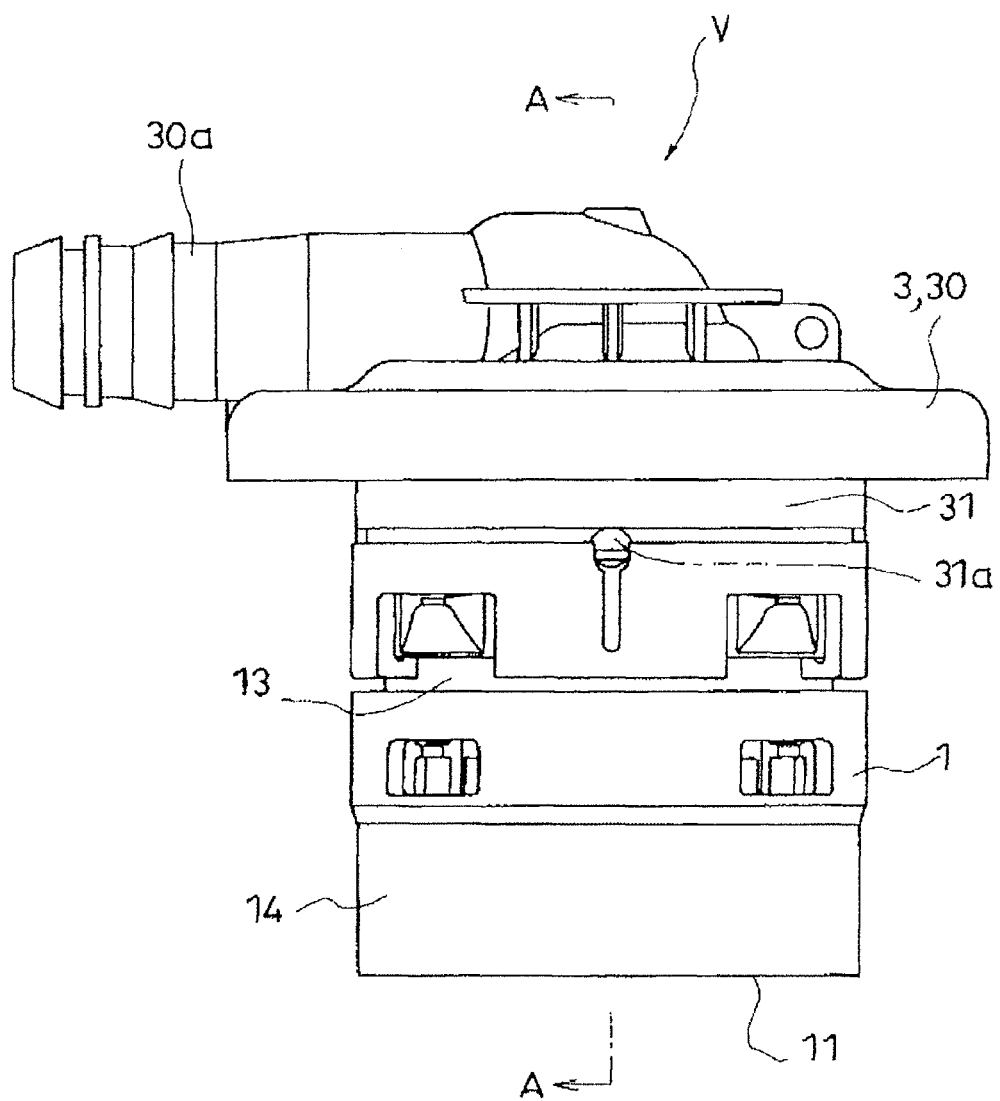
FIG. 1 is a side view of a valve device to which the present invention is applied.
Figure 2:
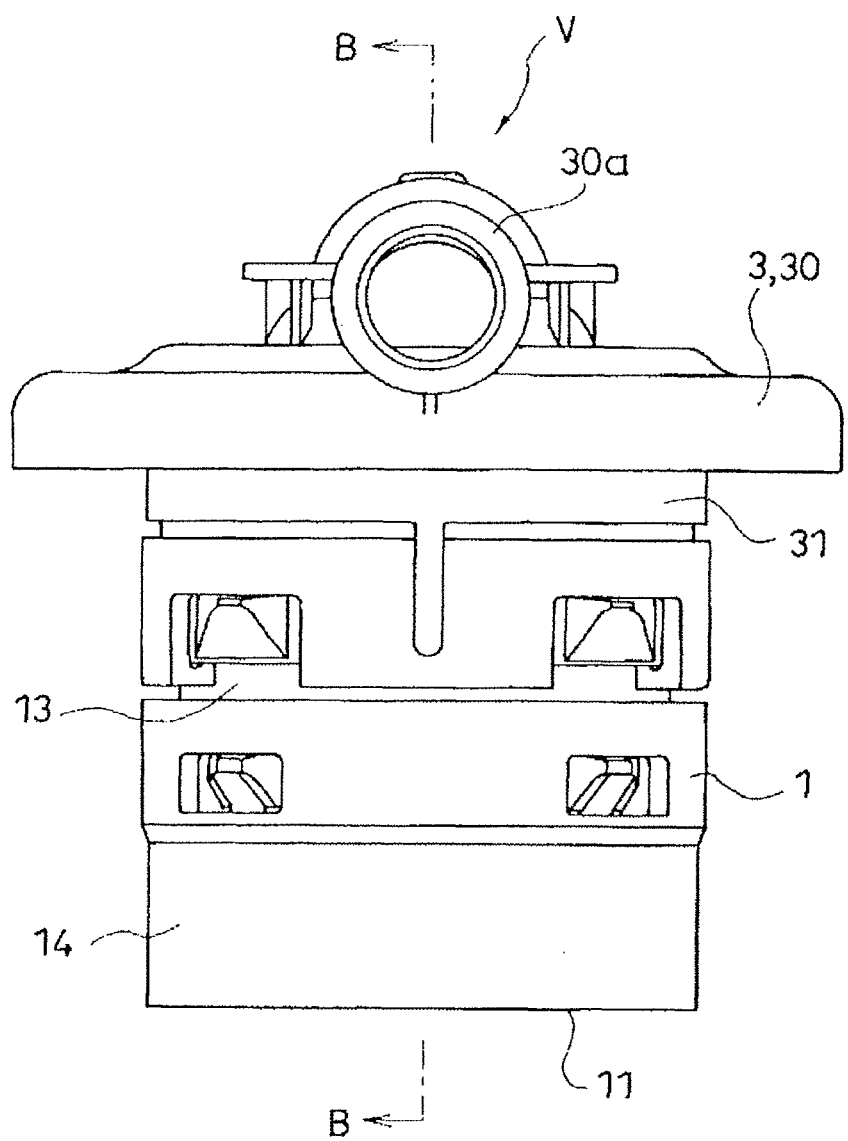
FIG. 2 is a side view of the valve device to which the present invention is applied as seen from the direction different from that in FIG. 1.
Figure 3:
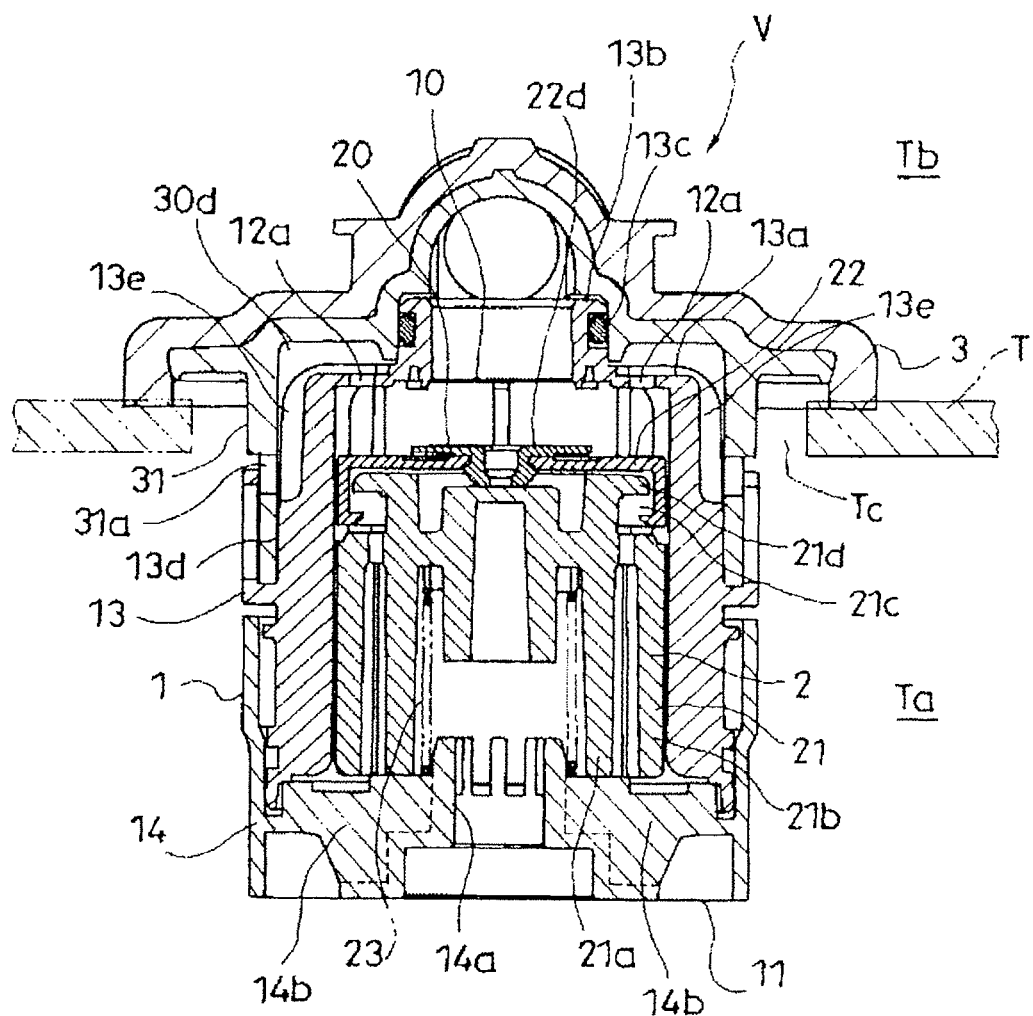
FIG. 3 shows the state where the valve device is provided to a fuel tank, in which the fuel tank is partially shown by imaginary lines and the cross section taken along the line A-A in FIG. 1 of the valve device is shown.
Figure 4:
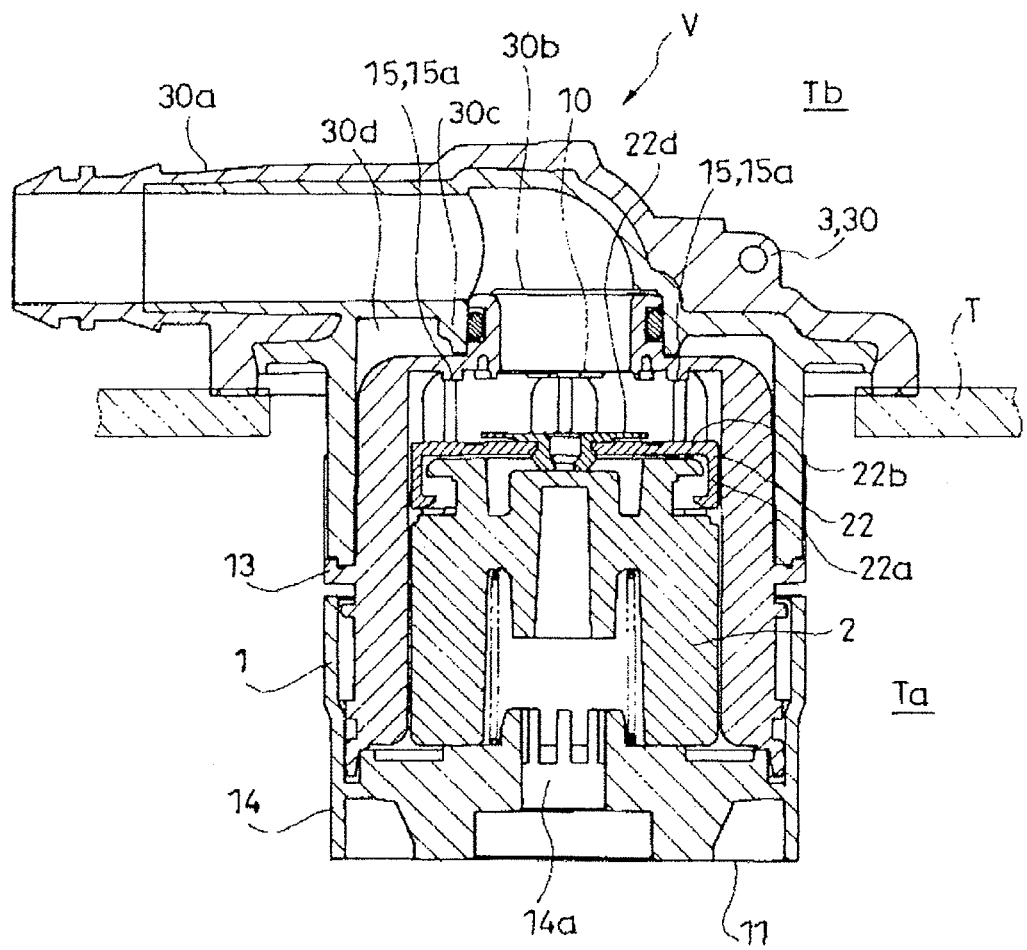
FIG. 4 shows the state where the valve device is provided to the fuel tank, in which the fuel tank is partially shown by imaginary lines and the cross section taken along the line B-B in FIG. 2 of the valve device is shown.
Figure 5:
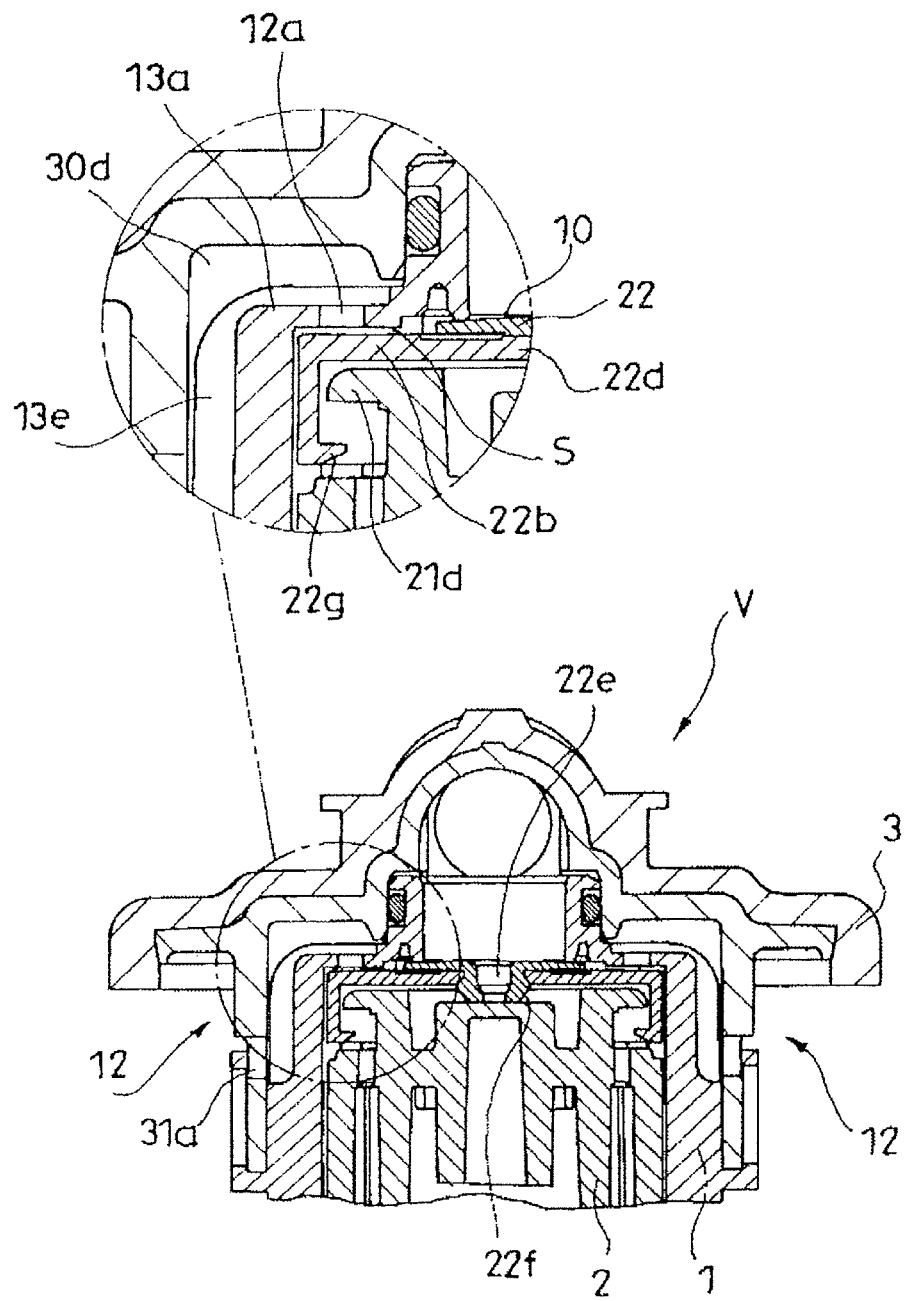
FIG. 5 is a cross-sectional view showing the state where fuel flows into a case structuring the valve device, whereby the float element rises and a vent valve port is closed thereby (i.e., the seated state).

In the following, with reference to FIGS. 1 to 6, a description will be given of a representative embodiment of the present invention. A valve device V for a fuel tank according to the present embodiment is mounted on a fuel tank T of an automobile, a motorcycle or the like, to function to establish communication between an intra-tank Ta and an extra-tank Tb in the valve-opened state.

The valve device V includes a case 1 and a float element 2.

The case 1 is provided with, at its upper portion, a vent valve port 10 that communicates with the extra-tank Tb, and an inflow portion 11 for fuel is provided below the vent valve port 10. Further, at the upper face portion of the case 1, a ventilation portion 12 that establishes communication between the intra-tank Ta and the inside of the case 1 is formed above the waterline of the float element 2 when seated, which will be described later.

The case 1 is structured with an upper body 13 and a lower body 14. The upper body 13 is cylindrically structured. The cylinder top end of the upper body 13 is closed by a top plate portion 13a that is provided with the vent valve port 10 of a round shape at its center. At the upper face portion of the case 1 structured with the top plate portion 13a, a short cylindrical portion 13b that projects upward from the top plate portion 13a so as to establish communication between the vent valve port 10 and the intra-cylinder space is integrally formed with the top plate portion 13a. To the outer side of the short cylindrical portion 13b, a seal ring 13c is fitted. The cylinder bottom end of the upper body 13 is opened.

On the other hand, the lower body 14 is cylindrically structured while having its cylinder top and bottom ends both opened. On the inner side of the lower body 14, a support portion 14a of the float element 2 is supported via a bridging piece 14b that spans across the outer edge of the support portion 14a and the inner face of the lower body 14. The space between the support portion 14a and the inner face of the lower body 14 serves as a ventilation passage. The inner diameter of the lower body 14 is structured to be substantially equal to the outer diameter of the upper body 13. In the illustrated example, by allowing the upper body 13 to be fitted into the lower body 14 from the cylinder bottom end side, the case 1 is structured. The case 1 structured in this manner allows the cylinder bottom end of the lower body 14 to function as the inflow portion 11.

According to the present embodiment, the case 1 is combined with the flange 3, so that the case 1 is mounted on the fuel tank T by the flange 3. The flange 3 has a head portion 30 and a cylindrical connecting portion 31 that projects downward from the head portion 30. The head portion 30 is integrally provided with a connecting tubular portion 30a that projects sideways. The connecting tubular portion 30a communicates with the space inside the cylindrical connecting portion 31 at the center of the head portion 30. This communicating portion 30b is surrounded by a round rising portion 30c on the inner side of the flange 3. In the illustrated example, by allowing the short cylindrical portion 13b of the upper body 13 to be fitted into the round rising portion 30c of the flange 3 to thereby fit the upper portion of the case 1 into the inner side of the cylindrical connecting portion 31 of the flange 3, the flange 3 and the case 1 are integrated with each other. The space between the short cylindrical portion 13b of the upper body 13 and the round rising portion 30c of the flange 3 is sealed by the seal ring 13c to establish the air-tight state. Thus, the intra-tank Ta and the extra-tank Tb are communicating with each other via the inflow portion 11 of the case 1, the vent valve port 10, and the connecting tubular portion 30a. The case 1 is arranged at the intra-tank Ta by being externally introduced into the mounting hole Tc, which has the dimension enough to prevent the head portion 30 of the flange 3 from entering and which is opened at the fuel tank T. By fixing the head portion 30 of the flange 3 to the outer face portion of the fuel tank T by welding or the like, the case 1 is provided to the fuel tank T.

In the present embodiment, at the top plate portion 13a of the upper body 13 and by the side of the vent valve port 10, through holes 12a that establish communication between the inside and outside of the case 1 are formed. Further, at the outer face of a side portion 13d on the top side of the upper body 13, a groove portion 13e whose groove top end is opened at the top plate portion 13a and that extends downward is formed. At the cylindrical connecting portion 31 of the flange 3, a ventilation port 31a that communicates with the groove portion 13e is formed. Further, a space 30d is formed between the top plate portion 13a of the upper body 13 and the top inner face of the flange 3. Further, in the present embodiment, an interval s is constantly formed between the upper face portion of the float element 2 and the upper face portion of the case 1 structured by the top plate portion 13a. Thus, in the present embodiment, communication is established between the intra-tank Ta and the inside of the case 1 by the ventilation port 31a, the groove portion 13e, the space s and the through holes 12a as the ventilation portion 12.

The float element 2 is accommodated inside the case 1, specifically, between the top plate portion 13a of the upper body 13 and the support portion 14a of the lower body 14 so as to be upward-and-downward movable. The float element 2 rises by the fuel flowing into the case 1 through the inflow portion 11, and seats on the vent valve port 10. That is, the distance between the top plate portion 13a and the support portion 14a is greater than the vertical dimension of the float element 2. In the illustrated example, the float element 2 is structured by a combination of the float body element 21 and the valve element 22. The float body element 21 is structured such that the inner cylinder 21a and the outer cylinder 21b are continuously connected at their cylinder top ends, so that a gap is formed between the inner cylinder 21a and the outer cylinder 21b. The cylinder bottom ends of the cylinders 21a and 21b are opened, respectively. Inside the inner cylinder 21a of the float body element 21, a compression coil spring 23 that brings the spring bottom end into contact with the support portion 14a is accommodated. The spring 23 exerts a certain upward biasing force to the float element 2.

Further, the valve element 22 is structured with a short cylindrical base 22a that has its cylinder top end closed by a top plate 22b provided with a through hole 22c at its center, and that has its cylinder bottom end opened, and a seal member 22d made of rubber or synthetic resin possessing rubber-like elasticity. The seal member 22d is structured disc-like and the outer diameter thereof is smaller than the outer diameter of the base 22a. A small hole 22e is provided at the center of the seal member 22d, and a cylindrical projecting portion 22f whose inside is communicating with the small hole 22e is provided at the bottom face of the seal member 22d. In the shown example, by allowing the cylindrical projecting portion 22f to be fitted into the through hole 22c of the top plate 22b of the valve element 22, the center portion of the outer face of the top plate 22b of the valve element 22 is covered by the seal member 22d.

Further, on the top side of the float body element 21, a round recessed portion 21c is formed at the side portion of the float body element 21. Thus, an outer collar-like portion 21d is formed at the upper portion of the float body element 21. On the other hand, at the bottom end of the valve element 22, a claw 22g that projects inward is formed. The valve element 22 causes the claw 22g to be positioned under the outer collar-like portion 21d of the float body element 21, so as to be combined with the float body element 21 in an upward-and-downward movable manner. Thus, the float element 2 is provided with the seal member 22d at its upper portion. The outer diameter of the seal member 22d is slightly greater than the vent valve port 10. When the float element 2 fully rises by the fuel flowing into the case 1 through the inflow portion 11, the seal member 22d seats on the vent valve port 10 from below, to thereby close the vent valve port 10.

In the present embodiment, the fuel supply to the intra-tank Ta is enabled basically by the ventilation through the following ventilation passage:

The inflow portion 11 at the bottom end of the case 1→the space between the float element 2 and the inner face of the case 1→the vent valve port 10→the connecting tubular portion 30a of the flange 3→a tube or the like connected to the connecting tubular portion 30a.

Until the fuel level of the intra-tank Ta reaches the inflow portion 11 of the case 1, the ventilation between the intra-tank Ta and the extra-tank Tb is secured through the inflow portion 11 and the ventilation portion 12. When the fuel level of the intra-tank Ta reaches the inflow portion 11 of the case 1, the pressure of the intra-tank Ta rises, which makes the pressure of the inside of the case 1 lower than that. Hence, the fuel flows into the case 1. In this state, the ventilation between the intra-tank Ta and the extra-tank Tb is established only through the ventilation portion 12. When the fuel flowing into the case 1 reaches a prescribed level, the float element 2 rises and the vent valve port 10 is closed, whereby the fuel level in the not-shown filler pipe rises. This causes the sensor of the fuel supply gun to detect that the tank T is filled up with the fuel. At this time, the ventilation portion 12 is formed above the waterline of the float element. When the fuel supply is stopped, by the ventilation through the ventilation portion 12, the pressure difference between the intra-tank Ta and inside of the case 1 is gradually eliminated, whereby the fuel level in the case 1 lowers; the float element 2 lowers; and the vent valve port 10 is opened again. Thereafter, the ventilation through the ventilation portion 12 and the vent valve port 10 is established, and the fuel level inside the filler pipe also lowers.

With such a valve device V, when seated, the ventilation through the ventilation portion 12 is reduced by the upper face portion 20 of the float element 2 positioned in close proximity to the upper face portion of the case 1. Specifically, the face portion at the top plate 22b of the valve element 22 that structures part of the upper face portion 20 of the float element 2 and that is not covered by the seal member 22d is positioned in close proximity to the opening of the through holes 12a that are formed at the top plate portion 13a of the upper body 13 and that structures the ventilation portion 12, whereby the amount of ventilation through the ventilation portion 12 is reduced. Thus, after the sensor of the fuel supply gun detects that the tank is filled up with the fuel and stops the fuel supply, the difference in the pressure between the inside of the case 11 and the intra-tank Ta can gradually be reduced. Thus, an immediate reduction in the fuel level inside the filler pipe is avoided, whereby an excessive fuel supply to the fuel tank T is prevented.

Further, according to the present embodiment, at the upper face portion of the case 1, a regulation portion 15 that maintains the interval between the upper face portion of the case 1 and the upper face portion 20 of the float element 2 when seated is provided. In the illustrated example, the regulation portion 15 is structured at the upper face portion of the case 1, that is, structured as projecting portions 15a that project downward from the bottom face of the top plate portion of the upper body.

Figure 6:
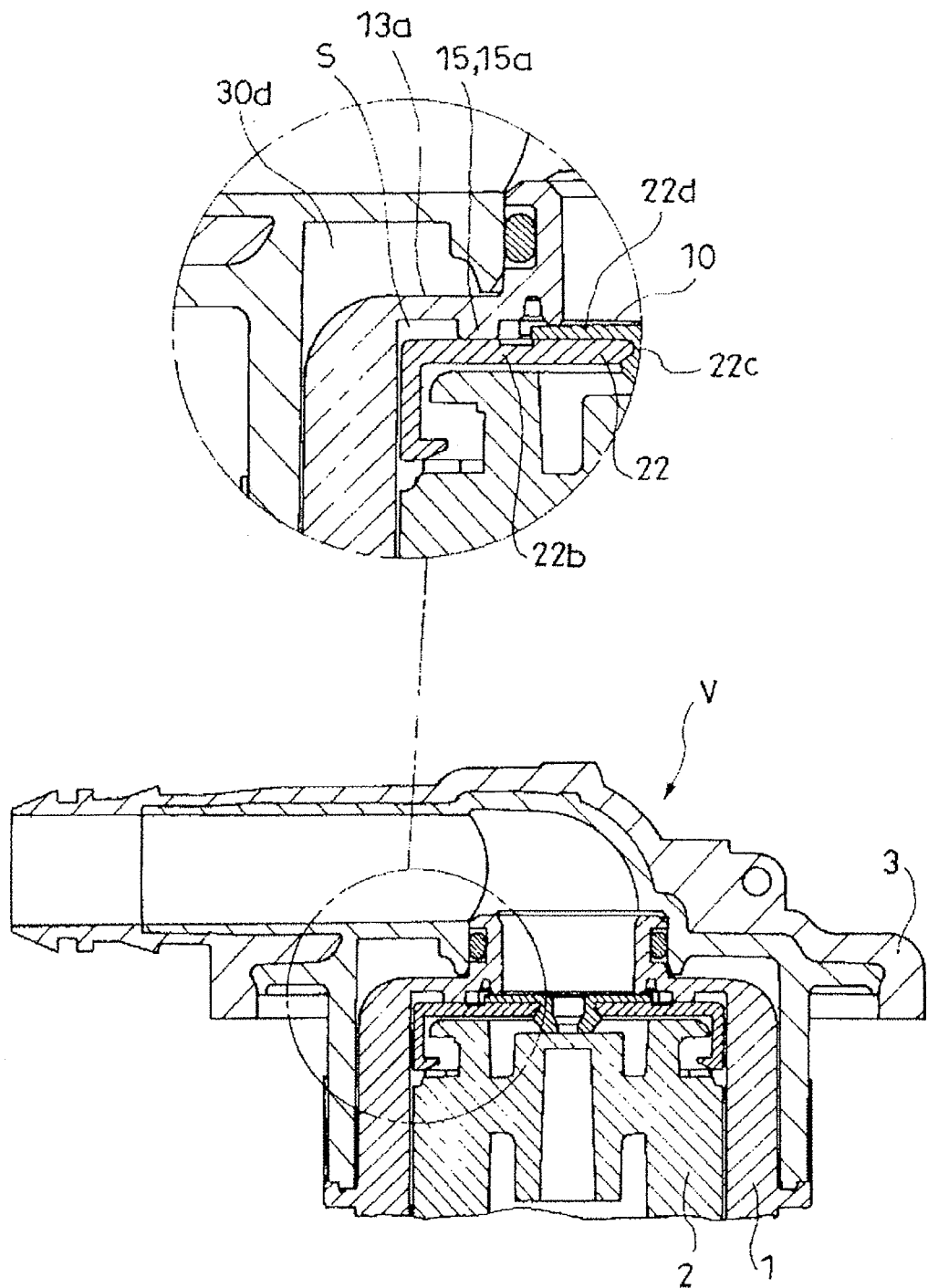
FIG. 6 is a cross-sectional view showing the state where the seated state of the float element is shown from the direction different from that in FIG. 5.

In the illustrated example, the through holes 12a each serving as the ventilation portion 12 are provided at the top plate portion 13a at two places. Between the two through holes 13a and 13a, the vent valve port 10 is positioned. The projecting portions 15a are provided at the places by the side of the vent valve port 10 and where the two through holes 12a and 12a are not formed. In the illustrated example, the projecting portions 15a are formed to be radially long rib-like about the vent valve port 10. A plurality of projecting portions 15a are provided, such that an interval is provided between adjacent ones of the projecting portions 15a in the circumferential direction of the vent valve port 10. Then, in the illustrated example, the projecting portions 15a abut on the face portion that is at the top face of the top plate 22b of the base 22a of the valve element 22 structuring part of the upper face portion 20 of the float element 2 and that is not covered by the seal member 22d, when seated (FIG. 6).

With such a regulation portion 15, the interval s between the upper face portion of the case 1 and the upper face portion 20 of the float element 2 when the float element 2 fully rises to cause the seal member 22d to be seated on the vent valve port will not be eliminated or become excessively narrow, and the ventilation volume through the ventilation portion 12 per unit time when seated can accurately be managed. This makes it possible to stabilize the time from when the float element 2 lowers because of the fuel supply being stopped after the seating takes place and until when the vent valve port 10 is opened again. Further, such stabilization of the interval also makes it possible to stabilize the deflection amount of the seal member 22d when seated.

The entire disclosure of Japanese Patent Application No. 2009-294675 filed on Dec. 25, 2009, including specification, claims, drawings, and abstract, is incorporated herein by reference in its entirety.

What is claimed is:

1. A valve device for a fuel tank, comprising:
   a case having a vent valve port arranged at an upper portion of the case and connected to outside of the tank, and an inflow portion for fuel arranged below the vent valve port;
   a float element accommodated in the case to move vertically and having a seal member at an upper portion thereof, the float element raising to seat the seal member on the vent valve port when the fuel flows into the case through the inflow portion; and a ventilation portion to connect between inside of the tank and inside of the case, formed at an upper face portion of the case positioned above a waterline of the float element when the float element is seated, wherein an amount of ventilation through the ventilation portion when the float element is seated is reduced by an upper face portion of the float element positioned in close proximity to the upper face portion of the case;

a projecting portion projecting downward from the upper face portion of the case and abutting on a face part of the upper face portion of the float element that is not covered by the seal member, wherein the projecting portion keeps an interval constant between the upper face portion of the case and the upper face portion of the float element when the float element is seated; and a flange having a head portion connected to the fuel tank at an outside thereof, and a connecting portion projecting from the head portion to an inside of the fuel tank, wherein the case comprises an upper body having said projecting portion and said ventilation portion, said upper body being disposed inside the connecting portion to form a space between the upper body and the connecting portion and communicating with the ventilation portion, and a lower body closing the upper body with the float element therein.

* * * * *